Patented May 9, 1950

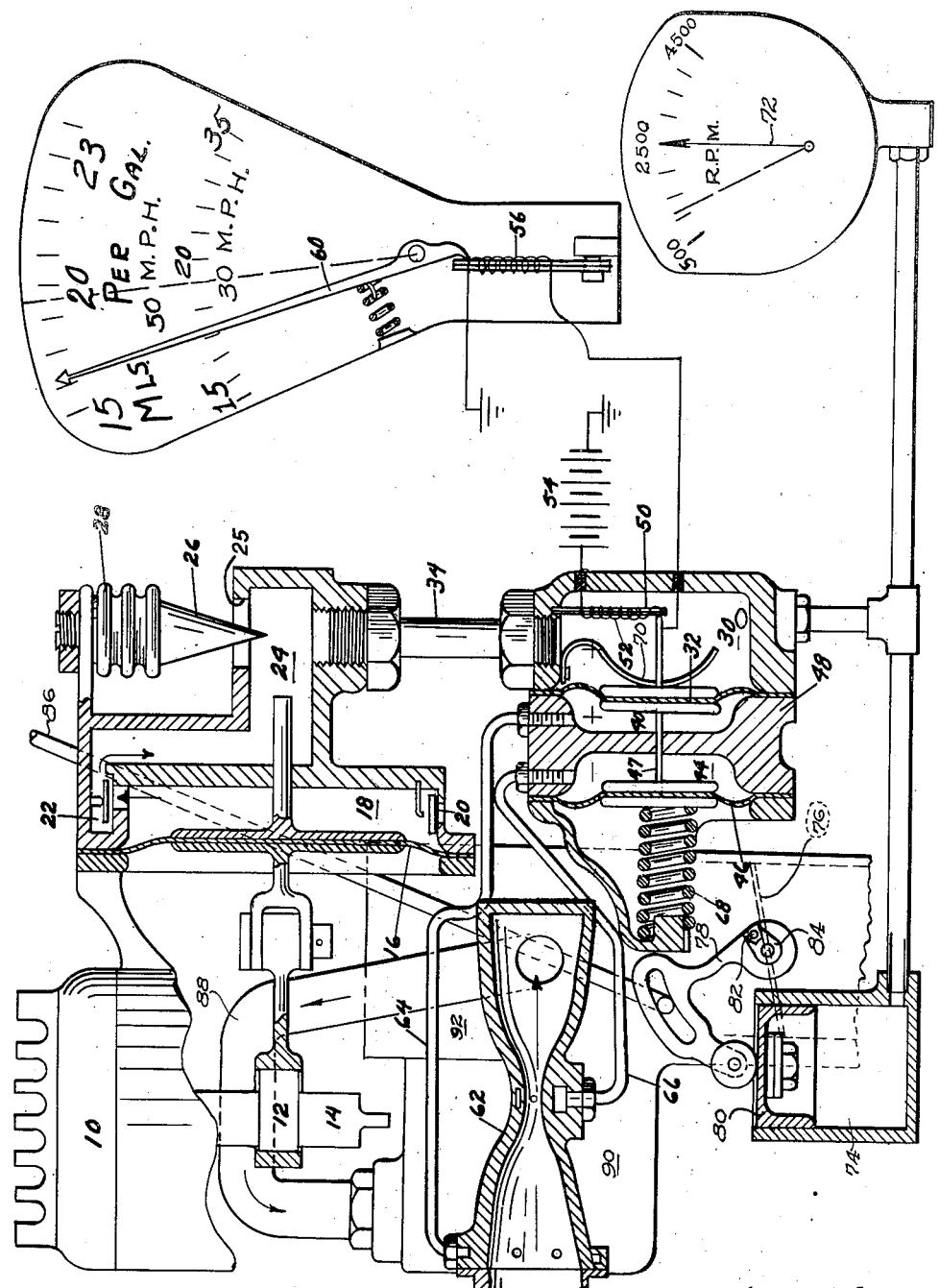

2,507,442

UNITED STATES PATENT OFFICE 2,507,442

MILEAGE METER

Danforth Holley and Stanley M. Udale, Detroit, Mich.

Application June 8, 1946, Serial No. 675,428

4 Claims. (Cl. 73—114)

The object of this invention is to provide a simple device for indicating when the fuel consumption measured in miles per gallon on a car is satisfactory. Heretofore, such devices that have been available have cost so much to make and install that they were not generally used.

The figure shows diagrammatically the preferred form of our invention.

In the figure 10 is the ignition distributor, 12 is an eccentric on the driving shaft 14 of the distributor, 16 is a diaphragm driven by the eccentric 12, 18 is an air chamber, 20 is a valve admitting air to the chamber, 22 is a valve permitting the discharge of air into a compressed air chamber 24, 26 is a needle moved by the temperature-responsive element 28, which element may also be made to respond to changes in atmospheric pressure but ordinarily temperature is the factor which changes most.

When the temperature is high and the barometer is low, the needle 26 descends and restricts orifice 25, open to atmosphere, and therefore the pressure in 24 at a given R. P. M. of the engine is as before, despite the drop in density of the air.

The chamber 30 to the right of the diaphragm 32 is in free communication through the pipe 34 with the chamber 24. Hence, the needle 26 controls the flow of air down pipe 34 and also to the atmosphere. When needle 26 restricts flow to the atmosphere it raises the pressure in chamber 30. The entrance to a fuel venturi 62, located between the fuel pump and a carburetor float chamber 90 is in communication through a pipe 64 with a chamber 40 to the left of the diaphragm 32. The throat of the venturi 62 is in communication through a pipe 66 with a chamber 44 to the right of a diaphragm 46. A partition separates the chamber 40 from the chamber 44. A connecting pin 47 slides in the partition and engages with the two diaphragms 32 and 46. A bi-metallic element 50 is located in the chamber 30 and is heated by means of a heating coil 52, provided with current from a storage battery 54. Assume that the flow of fuel changes, then the diaphragm 32 moves and if we assume the fuel flow falls the diaphragms 32 and 46 move to the left and open the electrical circuit. The current ceases to flow, the bimetallic element 50 cools and bends to the left, and again makes electrical contact sufficient to reheat the element and maintain the element in its new flexed position at a lower flow of electricity. This lower electrical current flow will then maintain the element 56 at a lower temperature and hence at a new flexed position corresponding to the new flexed position of the element 50. (See Patent 2,028,570 to Smulski.) Many millions of these devices are in use on automobiles as fuel gauges.

A similiar element 56, corresponding to the element 50, is shown located inside a dash instrument of a well-known type commonly used as a gasoline gage which is provided with a needle 60, which indicates in the upper scale miles per gallon when travelling at 50 miles per hour. There is a second series of graduations on the low scale so that a reading can be taken when the automobile is travelling at 30 miles per hour. At some reading of miles per gallon (in this case 19) the reading is the same regardless of the speed. The throttle is gradually opened or closed, as the case may be, until a reading of 19 miles per gallon is obtained. The reading of miles per hour is then an indication of how heavy the load is on the vehicle, or how free the engine is from friction. At light loads the speed will be higher than (a) at heavier loads, (b) with friction due to a brake that drags, (c) with a late spark, (d) with a rich mixture, or (e) with a weak mixture.

Nineteen miles per gallon is selected as one well within the possible range of fuel economy figures for all ordinary small 6 cylinder cars. In fact no ordinary 6 cylinder car gives such a low figure as 19 miles per gallon at 15 miles per hour on the level. Hence, it will always be possible to drive, even on a slight gradient, so as to obtain 19 miles per gallon at some steady speed above 15 miles per hour. If this is not the case there is something radically wrong with the car or with the engine or something moderately wrong with both the car and the engine. The broken line on the speedometer, to the left of the needle 72, indicates the R. P. M. that should be attained at 19 miles per gallon.

The venturi 62 can be selected to give this relationship at 15 miles per gallon with a car larger than ordinary (12 cylinder), or at 25 miles per gallon with a car smaller than ordinary (4 cylinder). At the selected relationship, as the speed increases, the venturi pressure drop increases as the square of the fuel flow. The air flow through the air restriction 25 produces an air pressure in 24 and 30 proportional to the engine speed squared. The air pressure increases as the engine speed is squared. Fuel drops in pressure as the fuel flow is squared. When these two are in balance the miles per gallon will be 19, for example, regardless of speed. There will be only one reading of miles per gallon with any given venturi 62, at which this relationship will hold true. As the speed increases the miles per gallon reading falls in the very well known manner. At the higher speeds and at the highest speeds no reading at all will be possible as the driver's eyes are then glued to the road and there will be no interest in fuel economy, so the scale need not be made to read at such low miles per gallon figures.

The broken line on the upper dial indicates the position the needle 60 assumes when the car operates at 19 miles per gallon at any speed. The broken line on the lower dial indicates an R. P. M. which shows that the engine and car are O. K.

The spring 70 balances the spring 68 when the needle 60 indicates the balance at 19 miles per gallon. Under these conditions the air pressure in 24 and the fuel differential in the throat 62 just balance each other. This condition, corresponding to 19 miles per gallon, is independent of speed of the engine.

72 is a revolution per minute indicator because the pressure in 24 gives a figure corresponding to R. P. M. The higher the speed the higher the pressure. The chamber 74 closes the throttle 76 through the arm 78 when the pressure in 24 balances the weighted piston 80. Pin 82 on the lever 78 engages with the element 84 mounted on the throttle shaft. There are manual means for closing the throttle 76 consisting of a rod 86 which engages with the slot in the throttle lever 78. The purpose of the weighted piston 80 is to limit the speed of the engine. The rod 86 can close the throttle when the air pressure overcomes the weight of this piston but can only permit the throttle to open wide under the influence of the weighted arm 78 when piston 80 overcomes the pressure of the air in chamber 74. The fuel from the venturi 62 flows through the pipe 88 and the float chamber 90 and delivers fuel to the carburetor 92 in a well-known manner.

*Operation*

A well-known mileage device consisting of a stop watch and a measuring gage or tube, which holds exactly 1/10 of a gallon, is used to accurately determine the miles per gallon at some speed, 30 miles an hour for example. A reading for miles per gallon at say 30 miles per hour is thus obtained. To calibrate this invention the instrument is then corrected by moving the dial so that it reads correctly in miles per gallon at 30 miles an hour. The only uncorrected variable is the variation in the density of the fuel. However, this variation is not very serious, except in hot weather when the device will be inaccurate for the reason that the fuel will then contain bubbles of vapor and air. A vapor separator would increase the cost prohibitively.

The theory of operation is as follows:

As shown in the drawing a balance at 19 miles per gallon is obtained. At that rate of fuel consumption, the velocity effect of the air pump and fuel flow will both increase as the square and will always be in balance. Hence, at 19 miles per gallon, the needle 60 will always indicate 19 miles per gallon at all speeds. As the load increases or the efficiency of the engine decreases the speed at which the needle indicates 19 miles per gallon decreases. Hence, the decrease in miles per hour is a measure (criterion) of the condition of the engine assuming a standard load in the car and a level road. Usually there is a level road available for test purposes and the load can very easily be selected at some standard, usually the weight empty. The driver can check his speed at which he gets 19 miles per gallon. The balanced miles per gallon should be selected at a possible economical reading, the car driven to give this reading and the speed noted at which this mileage reading is obtained. The higher the speed at which this 19 miles per gallon reading is obtained the more efficient is the car. If the speed is 50 miles per hour, then a smaller change in miles per gallon causes a bigger movement of the needle away from the point of equilibrium (19 miles per gallon) so the scale opens up.

Actual reading in miles per gallon can only be read at either 30 miles per hour or at 50 miles per hour. However, at all speeds, if the car is doing 19 miles per gallon, the needle 60 will be on the broken line.

When using the R. P. M. reading the engine is adjusted to run at the desired R. P. M. and the piston 80 which closes the throttle is weighted so that it closes the throttle at the critical R. P. M. of the engine.

What we claim is:

1. A miles per gallon meter for a vehicle driven by an engine operated by fluid fuel comprising an engine driven air pump, a pressure chamber into which said air pump discharges, a restricted outlet from said chamber, first and second fuel chambers, a fuel venturi through which the engine obtains its fluid fuel, a first pipe connecting the pressure side of said venturi to the first fuel chamber, a second pipe connecting the suction side of said venturi to the second fuel chamber, a first movable wall forming a wall of the first fuel chamber and a resilient member acting as an external support for said wall, a second movable wall forming a partition between the second fuel chamber and a portion of the air chamber, means rigidly connecting the two walls for movement together and an indicator including a needle operatively connected with said walls and movable in accordance with the movement of the walls to indicate a degree of unbalance in the chambers due to the opposing action of air pressure changing with speed and the fuel flow pressure drop, a dial across which said needle moves, the dial being calibrated in miles per gallon for a specific speed and normal load, to indicate the efficiency of the vehicle when driven at the specified speed and normal load.

2. A device as set forth in claim 1 in which there is a temperature responsive means adapted to control said restricted outlet from said air chamber so that the air pressure generated at any given speed does not vary with the temperature of the air.

3. A device as set forth in claim 1 in which there is barometric means adapted to control the restricted outlet from said air chamber so that the air pressure generated in said air chamber at any given speed does not vary with the barometer.

4. A device as set forth in claim 1 in which means responsive to both atmospheric pressure and to the temperature are adapted to control the restricted outlet from said pump air chamber so that the air pressure generated at any given speed does not vary with either temperature or barometric pressure.

DANFORTH HOLLEY.
STANLEY M. UDALE.

REFERENCES CITED

The following references are of record in the file of this patent:

UNITED STATES PATENTS

| Number | Name | Date |
| --- | --- | --- |
| 1,045,647 | Wallace | Nov. 26, 1912 |
| 2,009,659 | Hill et al. | July 30, 1935 |
| 2,251,498 | Schwien | Aug. 5, 1941 |
| 2,268,549 | Kennedy | Jan. 6, 1942 |